United States Patent
Katterloher et al.

(10) Patent No.: US 7,232,173 B2
(45) Date of Patent: Jun. 19, 2007

(54) STEP TAILGATE AND MOUNTING HARDWARE

(75) Inventors: Kurt Katterloher, Mississauga (CA); Lassi Mauno Ojanen, Richmond Hill (CA)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 11/243,149

(22) Filed: Oct. 4, 2005

(65) Prior Publication Data

US 2007/0075560 A1  Apr. 5, 2007

(51) Int. Cl.
*B60P 1/267* (2006.01)
(52) U.S. Cl. .......................... 296/50; 296/57.1; 296/62
(58) Field of Classification Search .................. 296/50, 296/57.1, 62; 280/164.1; 49/340, 26, 280
See application file for complete search history.

(56) References Cited

U.S. PATENT DOCUMENTS

| | | | | |
|---|---|---|---|---|
| 3,853,369 A * | 12/1974 | Holden | .......................... | 296/62 |
| 4,180,143 A * | 12/1979 | Clugston | ..................... | 280/166 |
| 5,028,063 A * | 7/1991 | Andrews | ...................... | 296/62 |
| 5,312,150 A * | 5/1994 | Quam | ........................ | 296/57.1 |
| 5,549,312 A * | 8/1996 | Garvert | ......................... | 296/62 |
| 5,941,342 A * | 8/1999 | Lee | ............................... | 280/166 |
| 6,364,391 B1 * | 4/2002 | Everett | ........................ | 296/57.1 |
| 6,905,158 B1 * | 6/2005 | Bastian | ......................... | 296/62 |
| 6,942,272 B2 * | 9/2005 | Livingston | .................... | 296/62 |
| 6,964,444 B2 * | 11/2005 | Chumley et al. | .............. | 296/62 |
| 6,966,597 B2 * | 11/2005 | Tegtmeier | ..................... | 296/62 |
| 6,983,972 B2 * | 1/2006 | Tan et al. | ................... | 296/57.1 |
| 7,059,648 B2 * | 6/2006 | Livingston | .................... | 296/62 |
| 7,073,837 B2 * | 7/2006 | Madlinger | .................. | 296/57.1 |
| 7,090,276 B1 * | 8/2006 | Bruford et al. | ............... | 296/62 |
| 2002/0070577 A1 * | 6/2002 | Pool et al. | ..................... | 296/62 |

* cited by examiner

*Primary Examiner*—Kiran B. Patel
(74) *Attorney, Agent, or Firm*—Warn, Hoffmann, Miller & Ozga, P.C.; Marc Luddy

(57) ABSTRACT

A step tailgate and mounting hardware system is presented where a tailgate can swing down to a position in order to create an intermediate stepping area. The tailgate has a primary hinge that allows the tailgate to swing down from a first position, to a second position. The tailgate has a bracket system that allows the tailgate to swing down to a third position in order to create an intermediate stepping area. The tailgate can move away from the vehicle by an inner arm. When the end of the inner arm reaches the end of the inside swing the inner arm can swing down by the inner and outer swing arms to a point where the swing arms are perpendicular to the main and inner arms. When the tailgate is in the third position the tailgate is below the truck bed, creating a stepping surface.

16 Claims, 4 Drawing Sheets

STEP TAILGATE AND MOUNTING HARDWARE

FIELD OF THE INVENTION

The present invention relates to a vehicle tailgate that can be positioned in an intermediate position between the ground and the truck bed for stepping purposes

BACKGROUND OF THE INVENTION

Some vehicles, such as a truck, have a tailgate that swings down to create a flat surface that is even with the truck bed. These types of tailgates, in combination with a flat surface area, such as a truck bed, are very helpful for hauling large objects. However, the tailgate and truck bed design lacks ergonomics, which can make it very difficult to put in or remove a large object from the truck bed or vehicle. The reason for this is because the tailgate creates a flat surface that is even with the truck bed, which is usually several feet from the ground. Due to the height of the vehicle, and not having anything to step-on at an intermediate height between the ground and the truck bed, it can be very difficult to get leverage when loading or removing a large object from the vehicle.

Some past attempts to resolve the above problem involve a bumper with integrated stepping surfaces. However, these stepping surfaces are unusable when the tailgate is in the down position and at a height even with the tailgate because the tailgate is covering the bumper. When one is trying to put a large object into the vehicle the tailgate is usually in the down position, and the integrated steps cannot be used. Thus, the integrated steps do not solve the ergonomics problem.

Other devices for increasing ergonomics involve fold out steps, which are located underneath the bumper and extend out towards the sides of the vehicle. The fold out steps can be used when the tailgate is in the down position and covering the bumper since they extend outward to the sides of the vehicle. However, the fold out steps usually have a small surface area for a person to place their foot on. The small surface area can make it difficult to use the fold out steps when attempting to get a large object into the vehicle.

It is desirable to have a tailgate which can swing down to create an even surface with the vehicle as known in the art, but can also swing down to a position below the bumper. When the tailgate is in the position below the bumper the tailgate creates a large flat stepping surface.

SUMMARY OF THE INVENTION

The present invention relates to a tailgate that can swing down to a position in order to create an intermediate stepping area. The tailgate has a primary hinge that allows the tailgate to swing down from a first position, to a second position. When the tailgate is in the second position it creates a flat surface that is even with the vehicle's flat surface, such as a truck bed. In addition, the tailgate has a bracket system which can be unlocked which allows the tailgate to swing down to a third position in order to create an intermediate stepping area. When the bracket system is unlocked the tailgate can move away from the vehicle by an inner arm. The inner arm is connected to the tailgate and moves in relation to rollers that are connected to the main arm. When the end of the inner arm reaches the end of the inside swing arm the inner arm can swing down by the inner and outer swing arms. The swing arms are connected to both the main arm and the inner arm by a pin, and the swing arms pivot at the pin points. The swing arms pivot to a point where they are perpendicular to the main and inner arms. At this point the tailgate is in the third position, and the inner arm is at a lower position than the main arm; thus, the tailgate can be used as an intermediate stepping area.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

For ease of describing the present invention the description will focus on the use of the present invention as a tailgate on a truck; however, the present invention is not limited to this embodiment. When a truck tailgate is in its upright position, or first position, it latches onto the truck bed's side walls in order to enclose the truck bed. Also, a truck tailgate can be folded down, in relation to a hinge that is mounted to tailgate and the truck bed's side walls, so that the tailgate extends horizontally from the truck bed at an even height, such that the tailgate creates an extension of the truck bed.

Figure 1:
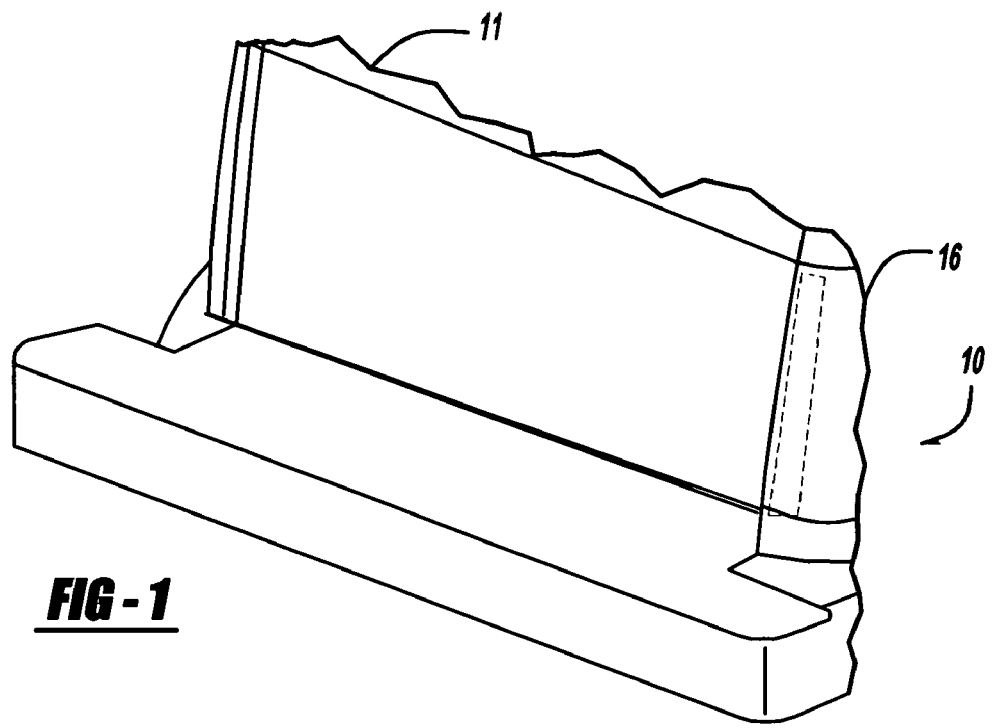
FIG. 1 is a perspective view of the step tailgate and the bracket system in the first position.

Referring to FIG. 1 a bracket system 10 is shown in the first position. While the bracket system 10 is in the first position a tailgate 11 is perpendicular a truck bed 12.

Figure 2:
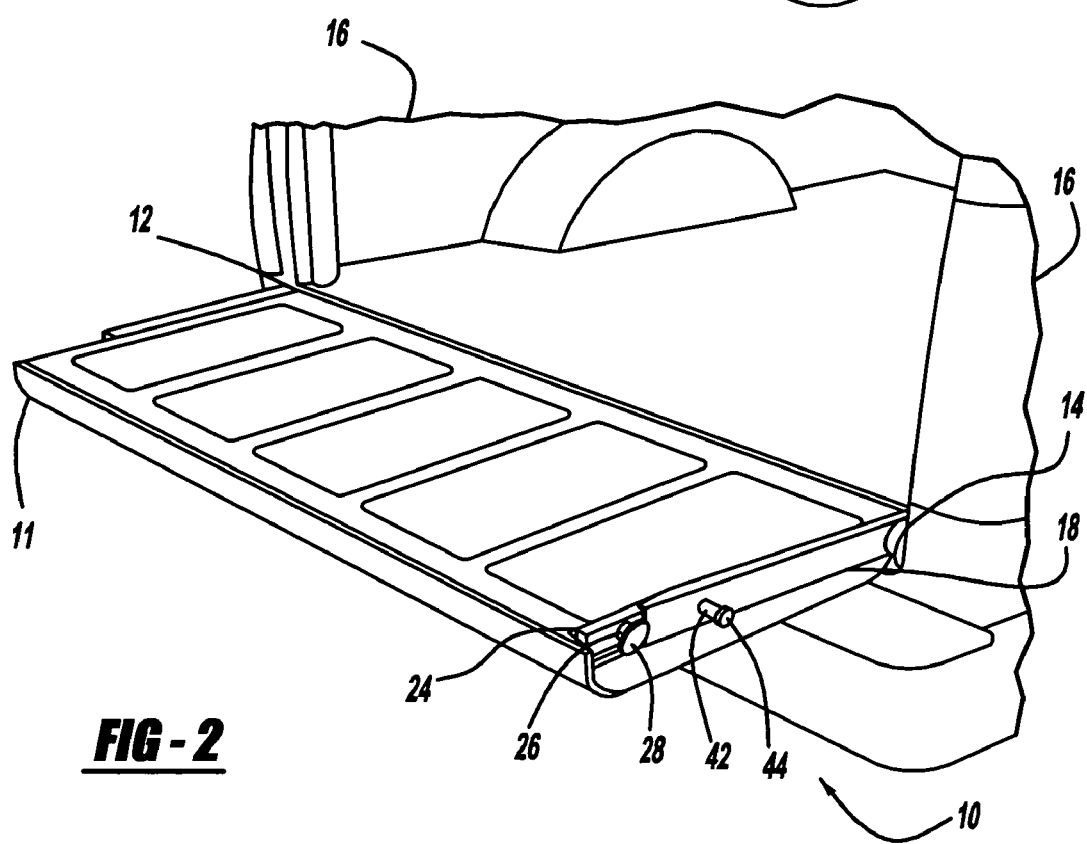
FIG. 2 is perspective view of the bracket system when the tailgate is in the second position.
Figure 3:
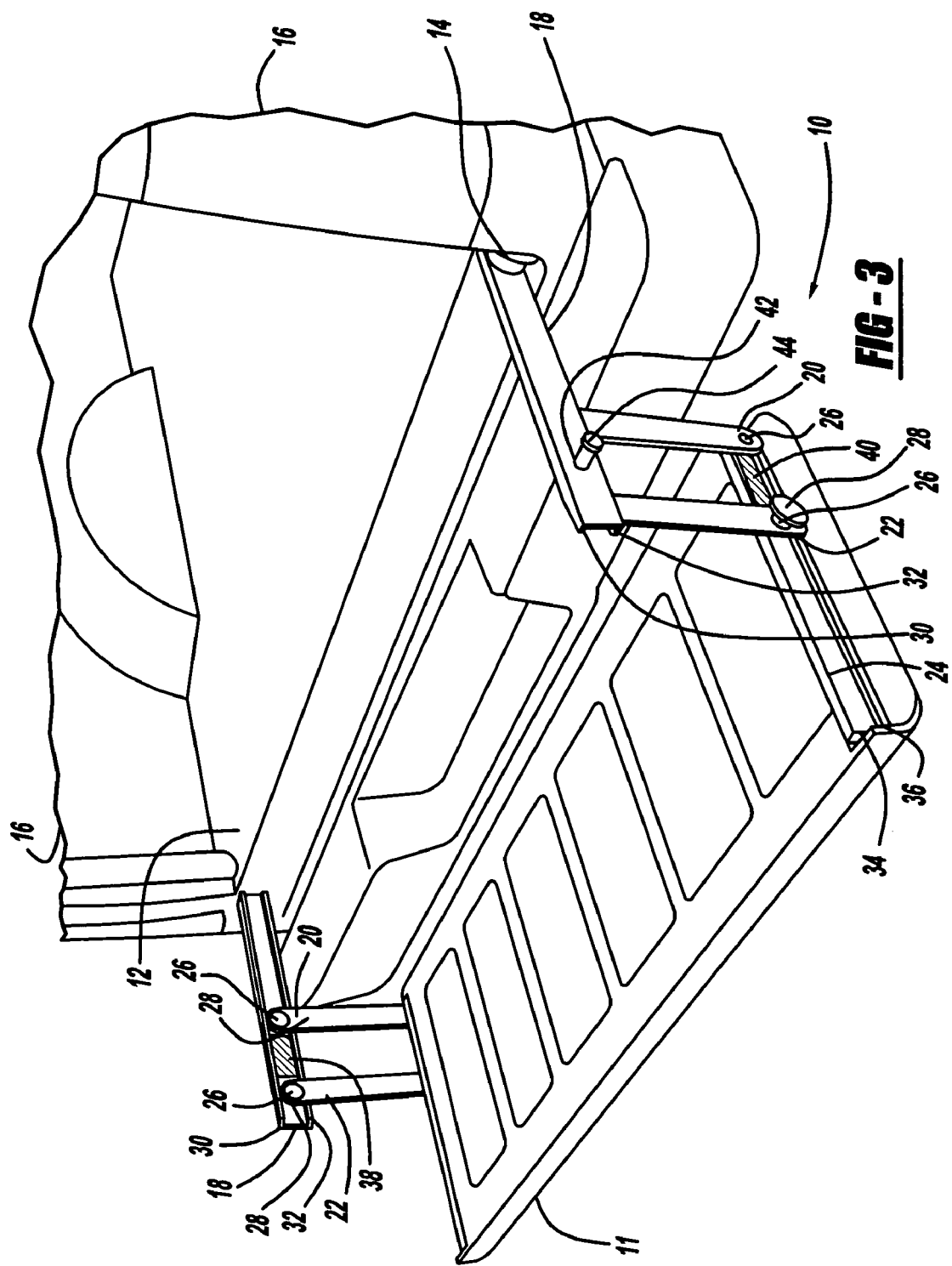
FIG. 3 is a perspective view of the bracket system when the tailgate is in the third position.

Referring to FIG. 2, the step tailgate with a bracket system 10 is shown in its second position. When the bracket system 10 is in the second position the tailgate 11 is at a height that is about the same height as the truck bed 12, such that an even surface extends from the truck bed 12 across the tailgate 11. As the tailgate 11 folds down from its first position to its second position the tailgate 11 pivots at a primary hinge 14. The primary hinge 14 is connected to side walls 16 that enclose the truck bed 12. However, the other end of the primary hinge 14 is not connected to the tailgate 11, it is connected to a main arm 18.

Referring to FIGS. 2–6, an inside swing arm 20 and an outside swing arm 22 are connected to the main arm 18 on the opposite side as the primary hinge 14. The ends of the inside swing arm 20 and outside swing arm 22 that are not connected to the main arm 18 are connected to an inside arm 24. The inside swing arm 20 is connected to the main arm 18 by a pin 26 and a roller 28. The pin 26 extends through the inside swing arm 20 such that the inside swing arm can rotate around the point of connection. The end of the pin 26 that is closest to the main arm 18 has a roller 28 attached to the end. The inside swing arm 20 is connected to the inside arm 24 in the same way, where the roller 28 is attached to the pin 26 on the side of the pin 26 closest to the inside arm 24. The outside swing arm 22 is connected to the main arm 18 in the same way as the inside swing arm 20 is connected to the main arm 18. The outside swing arm 22 is connected to the inside arm 24 in the same was as the inside swing arm 20, except a roller 28 is placed on both ends of the pin 26. Then, one side of the inside arm 24 lays flush and is connected to the tailgate 11.

The main arm 18 has an upper flange 30 that extends from the top of the main arm 18 towards the tailgate 11, and a lower flange 32 that extends from the bottom of the main arm 18 away from the tailgate 11. Even though the upper flange 30 and the lower flange 32 extend towards each other they do not come in contact, thus creating a track on the main arm 18 that contains the rollers 28. Similarly, the inside arm 24 has an upper flange 34 that extends from the top of the inside arm 24 towards the tailgate 11, and a lower flange 36 that extends from the bottom of the inside arm 24 away from the tailgate 11. A track is created on the inside arm 24 by the upper flange 34 and the lower flange 36 extending towards each other but not coming into contact with one another. The inside arm 24 track contains the rollers 28. The main arm 18 and the inside arm 24 are positioned such that the tracks created by the flanges 30, 32, 34, and 36 are facing each other.

An upper carrier plate 38 is placed between main arm 18 and the inside swing arm 20 and the outside swing arm 22 in order to maintain the spacing between the main arm 18 and the inside swing arm 20 and the outside swing arm 22. The pin 26 that connects the main arm 18 and the inside swing arm 20 extends through one end of the upper carrier plate 38 in order to keep it in position. The pin 26 that extends through the main arm 18 and the outside swing arm 22 extends through the other end of the upper carrier plate 38 in order to keep it in position.

The end of the inside swing arm 20 that is directly connected to the upper carrier plate 38 has a curvature 39. The curvature 39 extends towards the main arm 18. The length of the curvature 39 is equal to the width of the outside swing arm 22, in order to create an even mounting surface for the upper carrier plate 38 between the inside swing arm 20 and the outside swing arm 22.

Likewise, the lower carrier plate 40 is placed between inside arm 24 and the inside swing arm 20 and the outside swing arm 22. The pin 26 that connects the inside arm 24 and the inside swing arm 20 extends through one end of the lower carrier plate 40 in order to keep it in position. The pin 26 that extends through the inside arm 24 and the outside swing arm 22 extends through the other end of the lower carrier plate 40 in order to keep it in position.

The end of the outside swing arm 22 that is directly connected to the lower carrier plate 40 has a curvature 41. The curvature 41 extends towards the inner arm 24. The length of the curvature 41 is equal to the width of the inside swing arm 20, in order to create an even mounting surface for the lower carrier plate 40 between the inside swing arm 20 and the outside swing arm 22.

Figure 5:
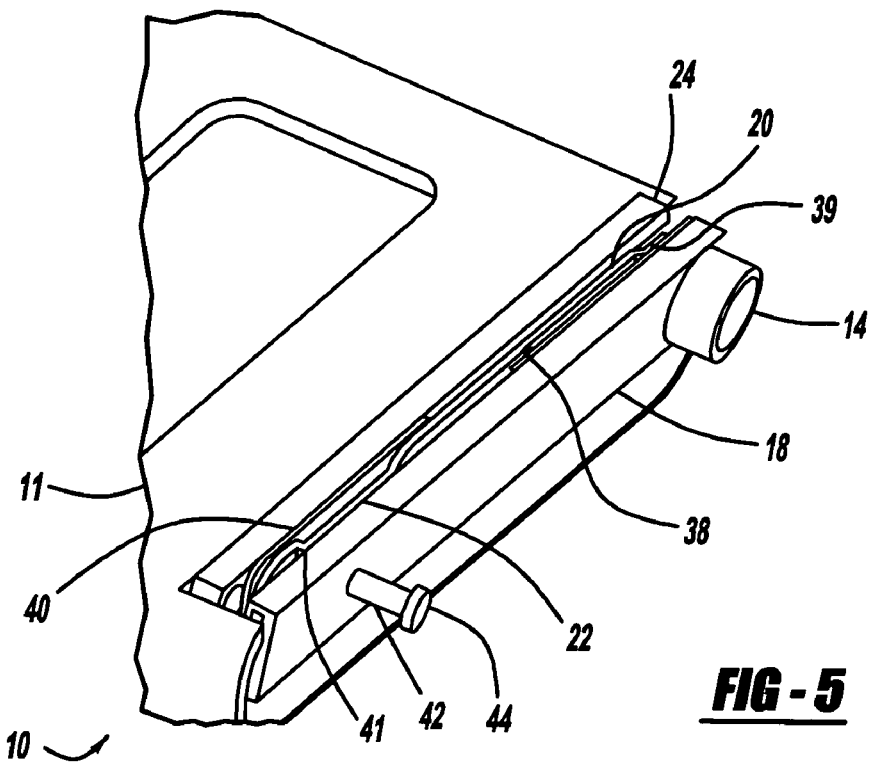
FIG. 5 is a perspective view of the bracket system when the tailgate is in the second position; and, FIG. 6 is a perspective view of the bracket system without the main arm, when the tailgate is in the second position.
Figure 6:
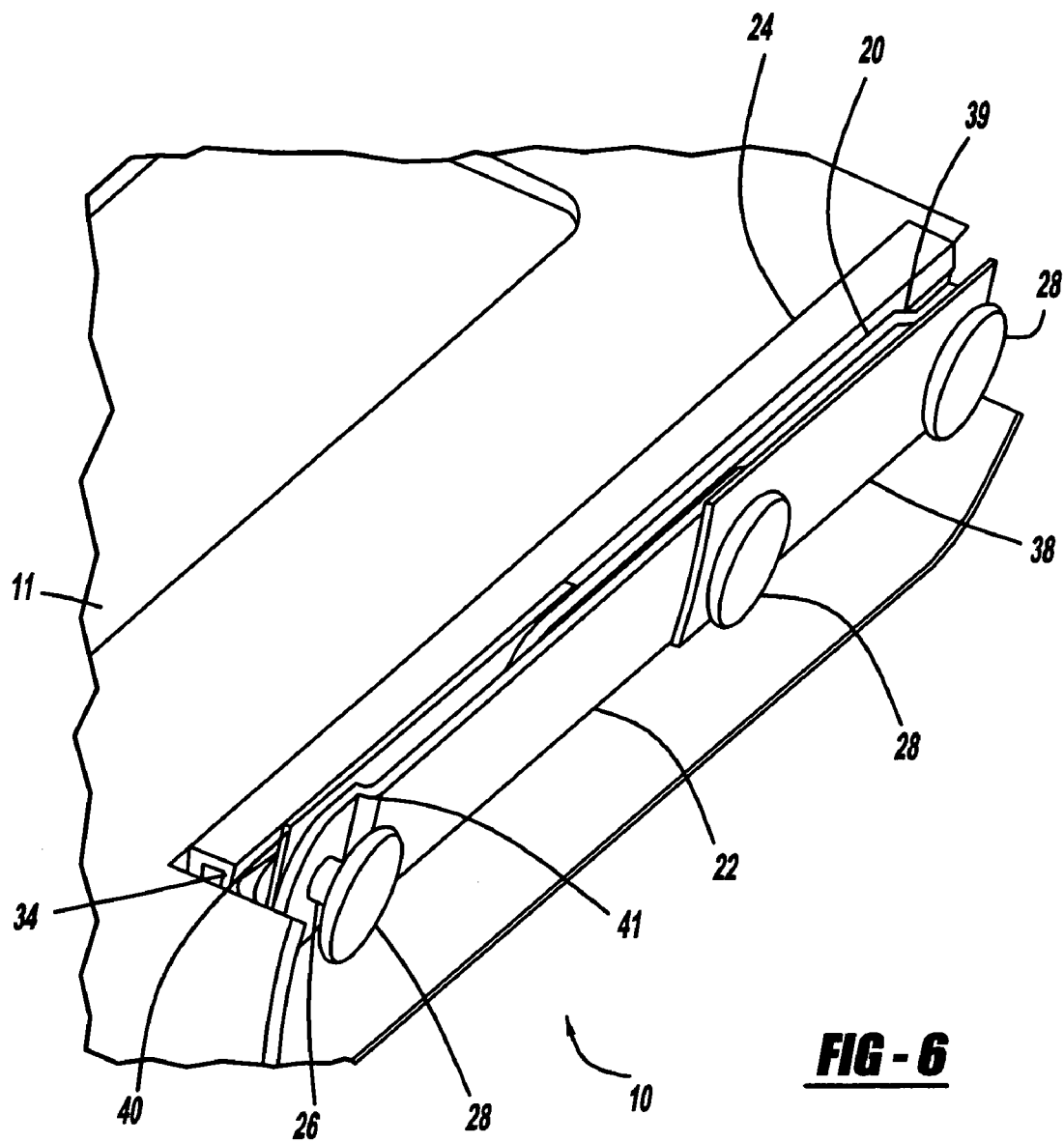

FIGS. 2, 5, and 6 show the bracket system 10 in the second position. When the tailgate 11 is in the second position the tailgate 11 moves with respect to the primary hinge 14, and creates a flat surface that is parallel to the truck bed 12. The inside swing arm 20 and the outside swing arm 22 are in parallel and in between the main arm 18 and the inside arm 24. Furthermore, a lock 42 prevents the tailgate 11 from moving in relation to anything other than the primary hinge 14 when the tailgate 11 is in the first and second position. The lock 42 extends through the main arm 18 and through the outside swing arm 22, the lower carrier plate 40, and the inside arm 24. When the tailgate 11 is in the first and second position the inside arm 24 cannot move with respect to the rollers 28; thus, the tailgate 11 can only move with respect to the primary hinge 14. The lock 42 has a handle 44 that extends out from the main arm 18.

Figure 4:
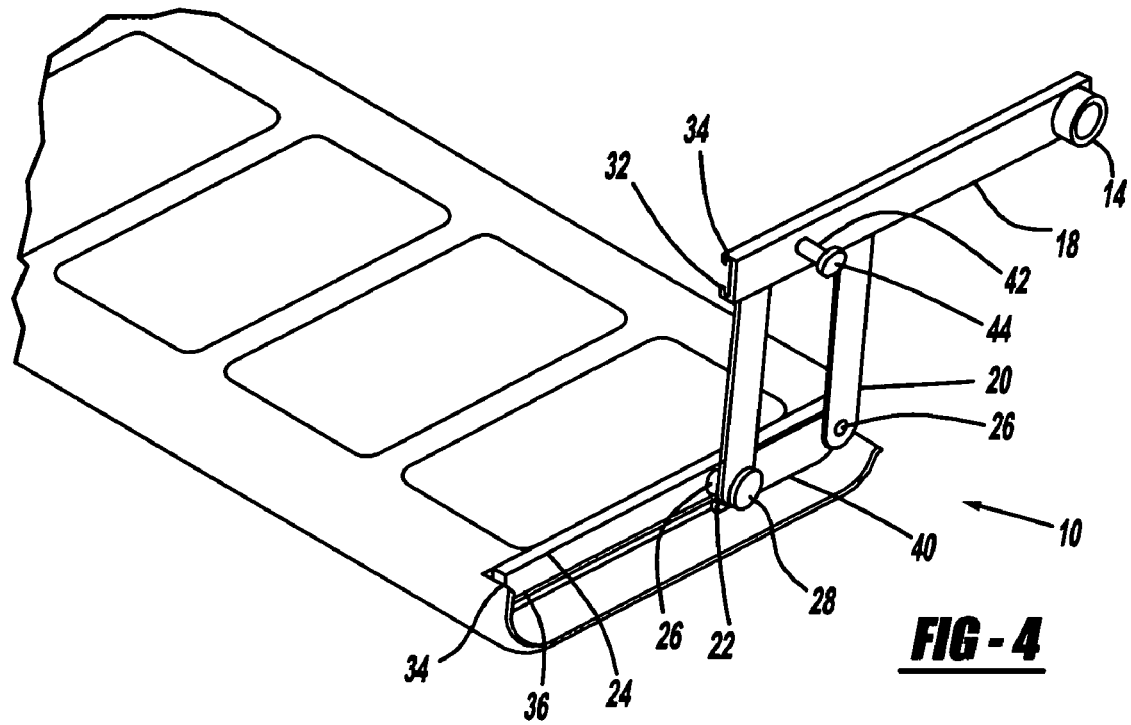
FIG. 4 is a perspective view of the bracket system when the tailgate is in the third position.

Referring to FIG. 4, the bracket system 10 and tailgate 11 can be placed in the third position from the primary position by first releasing the lock 42. The lock 42 can be released by pulling the handle 44 away from the main arm 18. Once the lock 42 is released the tailgate 11 can move away from truck bed 12. When the tailgate 11 moves away from the truck bed 12 the inside arm 24 is moving in relation to the rollers 28. Thus, the inside arm 24 is moving away from the truck bed 12, but remains parallel to the main arm 18. The tailgate 11 extends outward to a point where the end of the inside arm 24 that is closest to the truck bed 12 reaches the roller 28 that connects inside arm 24 with the inside swing arm 20. At this point the inside swing arm 20 and the outside swing arm 22 can pivot with respect to the pin 26 and roller 28 that is connected to the main arm 18. When this happens, the ends of the inside swing arm 20 and the outside swing arm 22 that are connected to the inside arm 24, pivot along the pin 26 connection points relative to the pivoting of the inside swing arm 20 and the outside swing arm 22 and the main arm 18. As the inside swing arm 20 and the outside swing arm 22 pivot in relation to the connection points, the inside arm 24 moves in a downward direction, such that the tailgate 11 is in the third position and is lower than the truck bed 12. The inside arm 24 moves downward until the inside swing arm 20 and the outside swing arm 22 are perpendicular to the inside arm 24 and the main arm 18. In the third position, the tailgate 11 can act as a stepping surface. In the preferred embodiment, the length of the inside swing arm 20 and the outside swing arm 22 are a length such that the tailgate 11 will be in a position halfway between the ground (not shown) and the truck bed 12.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A tailgate for a vehicle comprising:
   at least one primary hinge for pivoting said tailgate between a first position and a second position with respect to said vehicle;
   a bracket system substantially contained on said tailgate and bracket system, said bracket system including a roller track and associated roller;
   said bracket system having at least one inside arm pivotably connected to at least one swing arm, and at least one main arm pivotably connected to said at least one swing arm with said at least one roller;
   said bracket system connectable between said tailgate and said primary hinge for moving said tailgate between said second position and a third position, said third position places said tailgate below said second position;

said tailgate pivots about said at least one primary hinge to change from said first position to said second position; and said tailgate moves with respect to said at least one primary hinge along said roller track, and said at least one swing arm pivots relative to said at least one main arm and said at least one inside arm as said tailgate moves from said second position to said third position.

2. The tailgate of claim 1, wherein said at least one inner arm is connected to said tailgate.

3. The tailgate of claim 2, wherein at least one swing arm connects said main arm to said inner arm and pivots about the connection points with said main arm and said inner arm to a point where said swing arm is perpendicular to said main arm and said inner arm, and said tailgate is in said third position.

4. The tailgate of claim 1, wherein said at least one main arm pivots with respect to said primary hinge for moving said tailgate between said first position and said second position.

5. The tailgate of claim 1, further comprising at least one carrier plate inside said bracket system.

6. The tailgate of claim 1, further comprising of a lock that extends through said bracket system.

7. The tailgate of claim 1, wherein said bracket system has a main track, and said bracket system has an inner track.

8. The step tailgate of claim 7, wherein said bracket system has a first pin connection, and the end of said pin has a roller which is inside said main track.

9. The tailgate of claim 8, wherein said bracket system has a second pin connection, and the end of said pin has a roller which is inside said inner track.

10. The tailgate of claim 1, further comprising a first carrier plate on both sides of said at least one swing arm, such that said carrier plate is between said at least one swing arm and said at least one main arm, and a second carrier plate is between said at least one swing arm and at least one said inner arm.

11. The tailgate of claim 10, wherein said at least one inner arm, said at least one main arm, said at least one swing arm, and said carrier plate are parallel to one another when said tailgate is in said first position and said second position.

12. The tailgate of claim 1, wherein said at least one main arm has an upper flange that extends from the top of said at least one main arm towards said tailgate, a lower flange that extends from the bottom of said at least one main arm away from said tailgate, and said upper flange and said lower flange extend towards each other but do not contact each other to create a main track.

13. The tailgate of claim 12, wherein said at least one inner arm has an upper flange that extends from the top of said at least one inner arm towards said tailgate, a lower flange that extends from the bottom of said at least one inner arm away from said tailgate, and said upper flange and said lower flange extend towards each other but do not contact each other to create an inner track.

14. The tailgate of claim 13, wherein said at least one swing arm is connected to said at least one main arm by a pin that extends through said at least one swing arm and said carrier plate, and the end of said pin that is closest to said at least one main arm has a roller which is inside said main track.

15. The tailgate of claim 14, wherein said at least one swing arm is connected to said inner arm by a pin that extends through said at least one swing arm and said carrier plate, and the end of said pin that is closest to said inner arm has a roller which is inside said inner track.

16. The tailgate of claim 1, wherein a lock extends through said bracket system when said tailgate is in said first position and said second position.

* * * * *